(12) United States Patent
Cheng

(10) Patent No.: US 7,475,900 B2
(45) Date of Patent: Jan. 13, 2009

(54) BABY STROLLER FRAME

(75) Inventor: Huang-Yi Cheng, Chiai County (TW)

(73) Assignee: Link Treasure Limited, Tortola (VG)

( * ) Notice: Subject to any disclaimer, the term of this patent is extended or adjusted under 35 U.S.C. 154(b) by 168 days.

(21) Appl. No.: 11/546,426

(22) Filed: Oct. 12, 2006

(65) Prior Publication Data
US 2007/0085303 A1     Apr. 19, 2007

(30) Foreign Application Priority Data
Oct. 14, 2005     (TW)     .............................. 94217778 U (51) Int. Cl.
B62B 3/02     (2006.01)
(52) U.S. Cl. ........................ 280/642; 280/643; 280/648; 280/47.38
(58) Field of Classification Search .................. 280/638, 280/639, 642, 643, 647, 648, 649, 650, 657, 280/658, 47.38, 47.41
See application file for complete search history.

(56) References Cited

U.S. PATENT DOCUMENTS

| | | | | |
|---|---|---|---|---|
| 5,333,893 A | * | 8/1994 | Chen | .......................... 280/642 |
| D429,664 S | * | 8/2000 | Gehr | .......................... D12/129 |
| D430,076 S | * | 8/2000 | Gehr | .......................... D12/129 |
| 6,209,892 B1 | * | 4/2001 | Schaaf et al. | .......... 280/33.993 |
| 6,513,827 B1 | * | 2/2003 | Barenbrug | .................. 280/648 |
| 6,863,286 B2 | * | 3/2005 | Eros et al. | ................. 280/47.38 |
| 7,032,922 B1 | * | 4/2006 | Lan | ............................. 280/648 |
| 7,367,581 B2 | * | 5/2008 | Yang | .......................... 280/642 |
| 7,377,537 B2 | * | 5/2008 | Li | ............................... 280/650 |
| 2003/0111825 A1 | * | 6/2003 | Lo et al. | ...................... 280/642 |

* cited by examiner

*Primary Examiner*—Christopher P Ellis
*Assistant Examiner*—John D. Walters
(74) *Attorney, Agent, or Firm*—Muncy, Geissler, Olds & Lowe, PLLC (57) ABSTRACT

A stroller frame including a wheeled support, a lower support joint, an upper support, and a connecting joint that commonly form a foldable linkage system. The wheeled support has a pair of push bars and an actuator associated with a flexible element, so as to control the rotation of each push bar. When the end of the push bar is released, the connecting joint is driven by the push bars and carries the wheeled support, the lower support joint, the upper support, which are simultaneously rotated and moved from an erect position to a collapsed position. The upper support is furnished with a connector for detachably securing a stroller seat, a safety seat, or an infant carrier. In addition, the lower support joint may extend upwardly with a plurality of extension arms for detachably securing two seats, two safety seats or an infant carrier. This provides a stroller frame having multiple uses and greater convenience.

20 Claims, 8 Drawing Sheets

BABY STROLLER FRAME

BACKGROUND OF THE INVENTION

1. Field of the Invention

This invention relates to a baby stroller frame and, in particular, to a foldable baby stroller frame having an upper support for connecting with an infant carrier, and a pair of extension arms for supporting one or two safety seats.

2. Description of the Prior Art

A foldable baby stroller frame generally comprises a linkage system which can be folded from an erect position to a collapsed position. The folding can be actuated by a user's hand, so as to release a pair of joint members from a locked position. An example of this type of baby stroller frame can be found in U.S. Pat. No. 5,772,235.

However, the assembly process of the above-mentioned structure requires a troublesome amount of work. Further, when applying the structure in a dual seat baby stroller, the linkage system becomes complex and increases in size, which can lead to unexpected trouble in the folding operation of the stroller.

SUMMARY OF THE INVENTION

In order to resolve the above-mentioned problems, the present invention provides a stroller frame with a simple structure that can detachably hold an infant carrier and secure both a front safety seat and rear safety seat.

The stroller frame according to the present invention may include a wheeled support, a lower support joint, an upper support, and a connecting joint, which commonly pivot and form a foldable linkage system.

The wheeled support has a pair of push bars and an actuator associated with a flexible element, to control the rotation of each push bar. When the ends of the push bars are released, the connecting joint is driven by the push bars and can carry the wheeled support, the lower support joint, and the upper support, which are moved simultaneously from an erect position to a collapsed position. The upper support is furnished with a connector for detachably securing a seat, a safety seat, or an infant carrier.

Furthermore, the lower support joint may extend upwardly with a plurality of extension arms, for detachably securing two baby stroller seats, two safety seats or an infant carrier. This provides the user a stroller frame having multiple uses and greater convenience.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
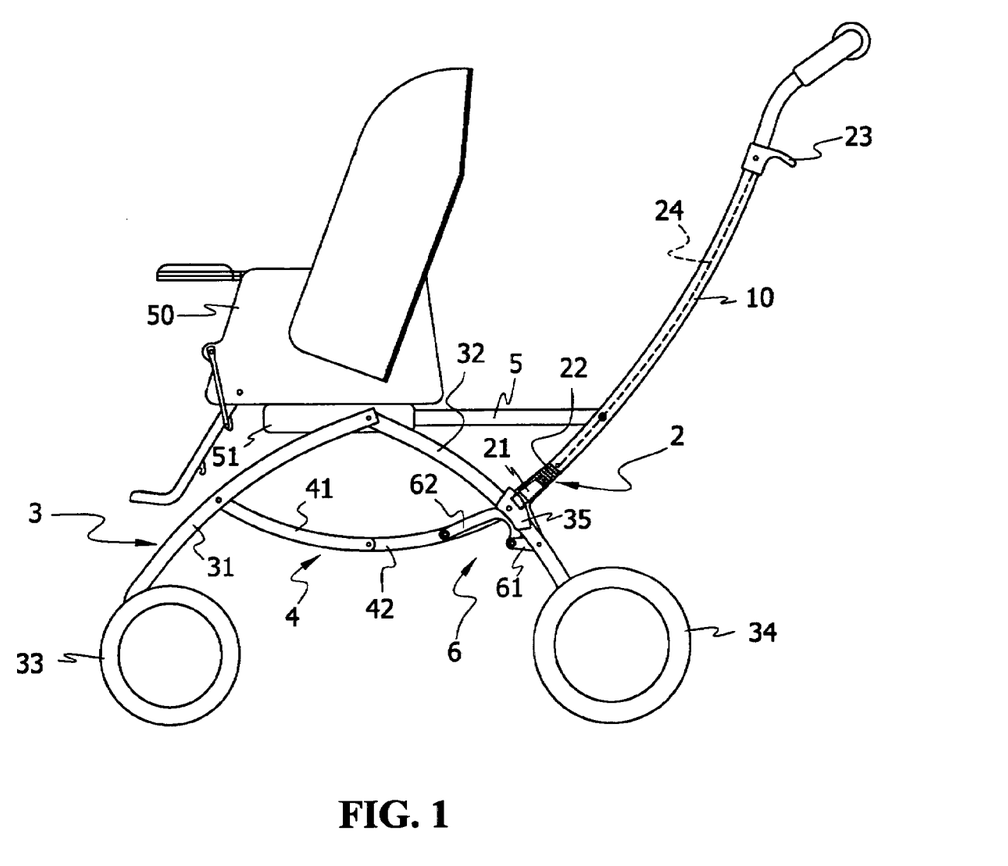
FIG. 1 is a side view of a stroller frame of the present invention.
Figure 2:
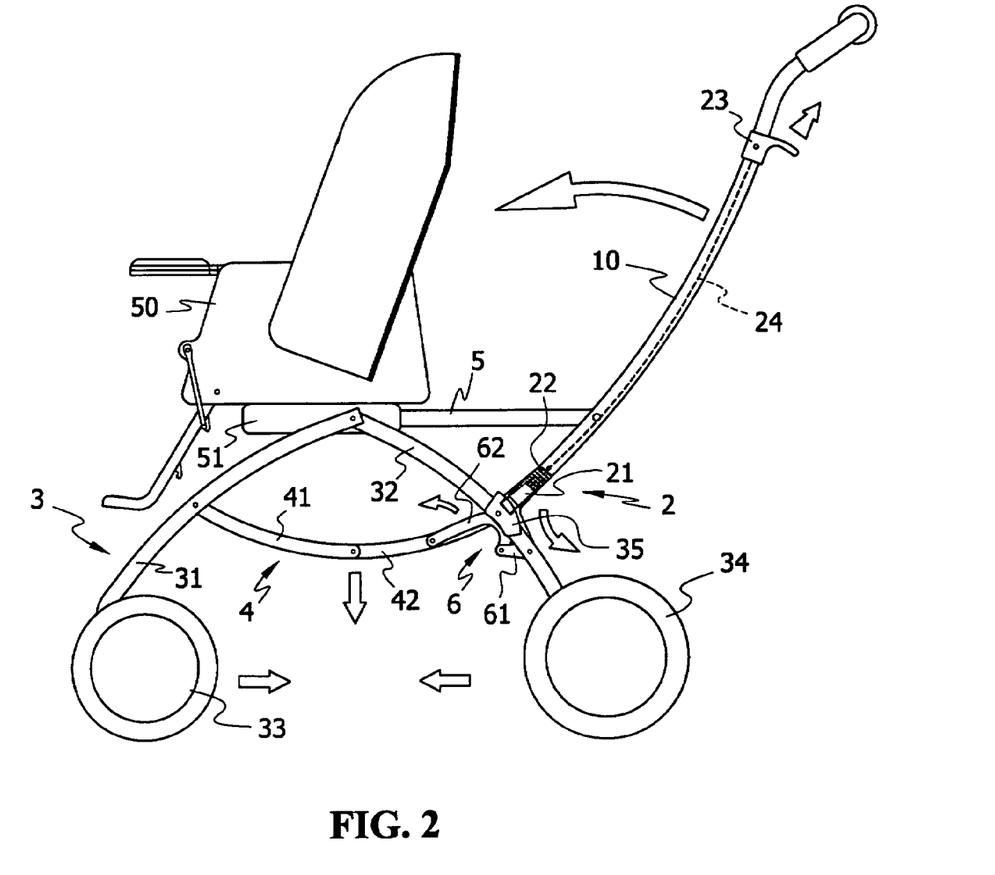
FIG. 2 is a side view schematically showing the folding operation of the stroller of the embodiment of FIG. 1.
Figure 3:
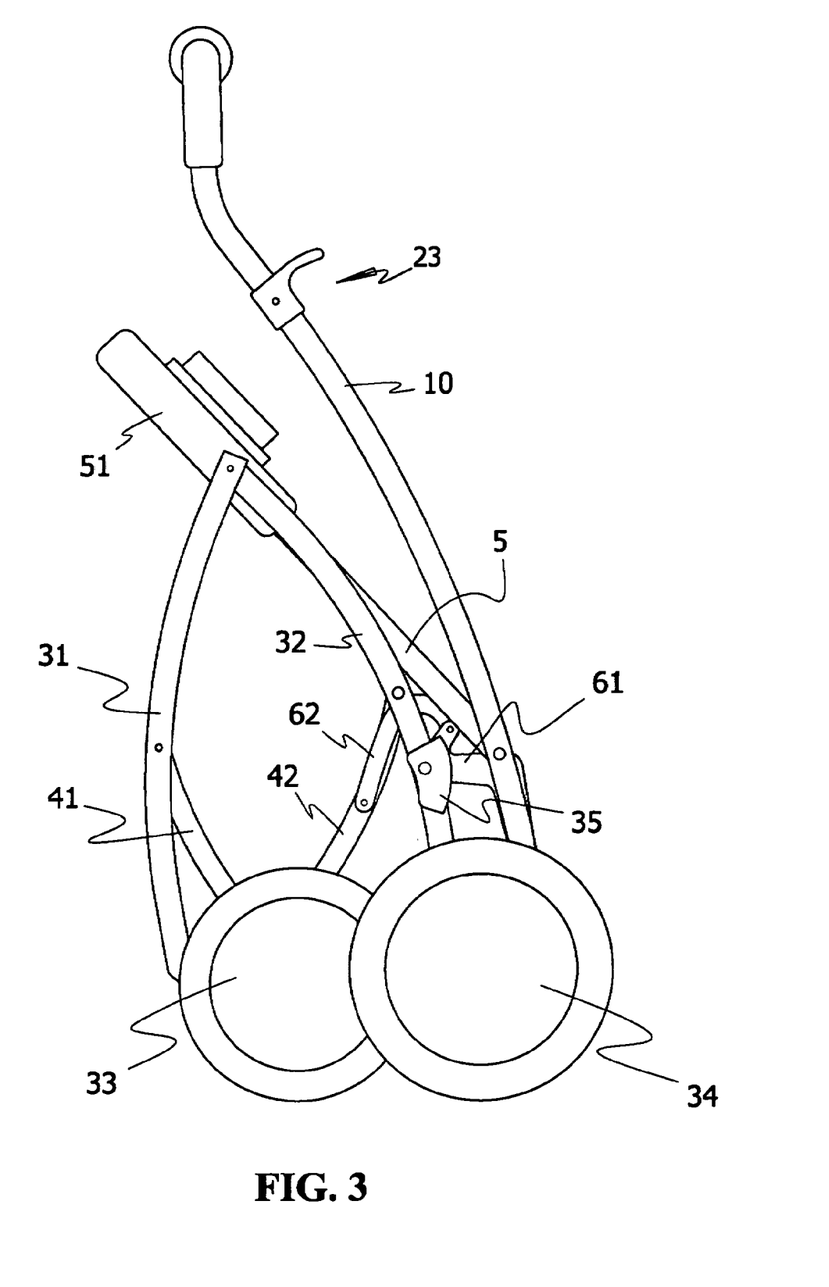
FIG. 3 is a side view for schematically showing the folded position of the stroller of the embodiment of FIG. 1.

Referring to FIGS. 1 to 3, an embodiment of a stroller frame according to the present invention includes a wheeled support (3), a lower support joint (4), a upper support (5), and a connecting joint (6) which is lockable and releasable controlled by an actuator (23) mounted on a pair of push bars (10).

The wheeled support (3) comprises a pair of front legs (31) each connected with a front wheel set (33), a pair of rear legs (32) each connected with a rear wheel set (34), and a pair of push bars (10) substantially connected as a U-shaped frame with a handle portion on the upper end thereof. The upper ends of the front legs (31) and the rear legs (32) are pivotally connected together, so as to rotate between an erect position and a collapsed position.

The lower support joint (4) comprises a front support element (41) and a rear support element (42). The front support element (41) has one end pivoted to the front leg (31) and another end pivotally connected with the rear support element (42).

The upper support (5) has a portion pivoted to at least one of the upper ends of the front legs (31) and the upper end of the rear legs (32), has another portion pivoted to the push bars (10), and has one end connected with a connector (51) for detachably securing a regular baby stroller seat (50).

The connecting joint (6) has a first connecting piece (61) and a second connecting piece (62). The first connecting piece (61) has one end pivoted to the rear leg (32) and another end pivotally connected with the push bars (10). The second connecting piece (62) has one end pivotally connected with the rear support element (42), and another end pivoted to the first connecting piece (61).

The actuator (23) is associated with a folding control mechanism (2) via a flexible connecting element (24), for locking and releasing the push bars (10), so as to control rotation thereof.

The folding control mechanism (2) comprises a locking element (21) and a resilient element (22) which are both telescopically accommodated within the hollow end portion of the push bars (10). The resilient element (22) is normally biased on the locking element (21), so as to keep it locked into a positioning portion on the rear leg (32). This forms a cross-shaped linkage system which restricts the relative rotation between the push bars (10), the rear leg (32) and the upper support (5), and therefore keeps the entire stroller frame in an erect position.

Preferably, a holding base (35) may secure the rear leg (32) at a position corresponding to the locking element (21), so as to engage and disengage with the locking element (21). The resilient element (22) can be a compression spring biasing the locking element (21) outwardly against the holding base (35) on the rear leg (32).

Referring to FIG. 2, a user can pull the locking element (21) by moving the actuator (23) via the flexible connecting element (24). This forces the locking element (21) to disengage from the holding base (35) on the rear leg (32). In such an instance, the connecting joint (6) pivotally carries the lower support joint (4) and the wheeled support (3), which are simultaneously rotated and moved in the direction indicated by the arrows.

In a preferred embodiment, the flexible connecting element (24) can be a wire which runs through the push bar (10) and is operatively associated with the actuator (23) and the locking element (21). FIG. 3 shows the stroller frame rendered in a collapsed position by the operation of FIG. 2, for convenient storage and transportation.

Figure 4:
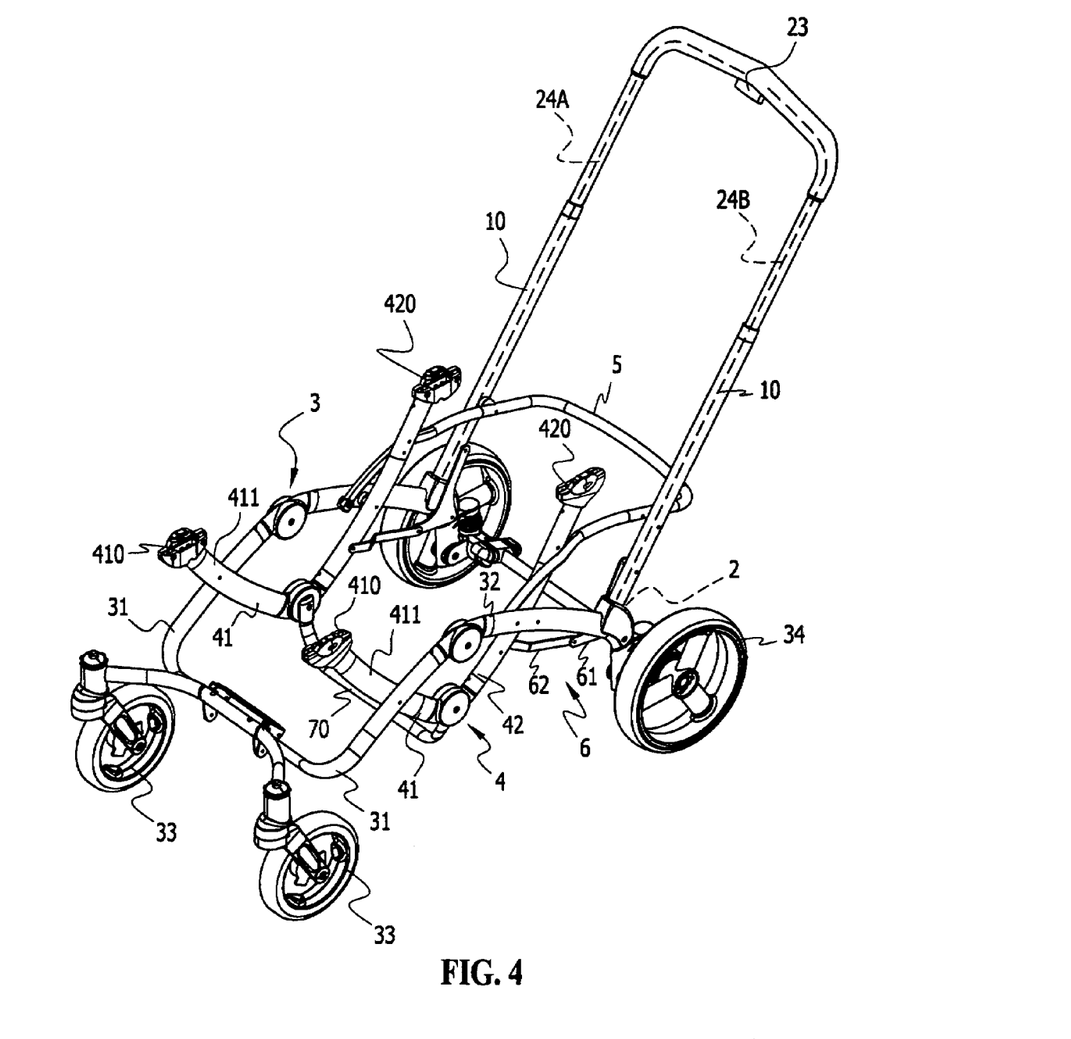
FIG. 4 is a perspective view showing an alternative embodiment of the stroller frame of the present invention.
Figure 5:
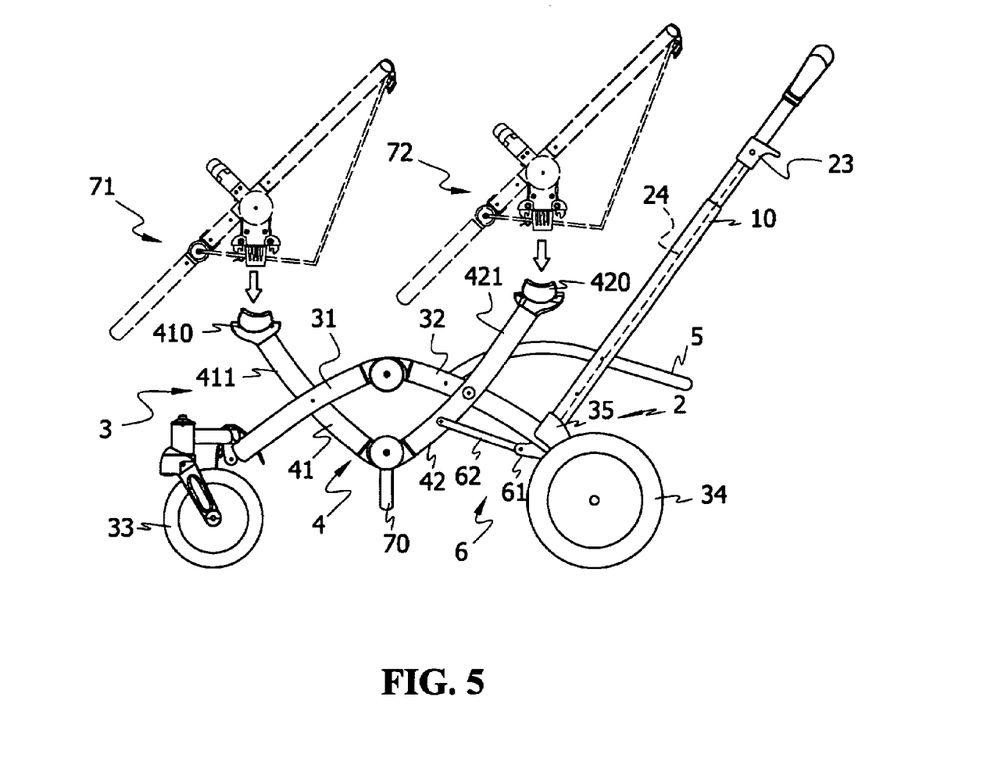
FIG. 5 is a side view schematically showing the operation of the connection of two seats on the stroller frame of the embodiment of FIG. 4.
Figure 6:
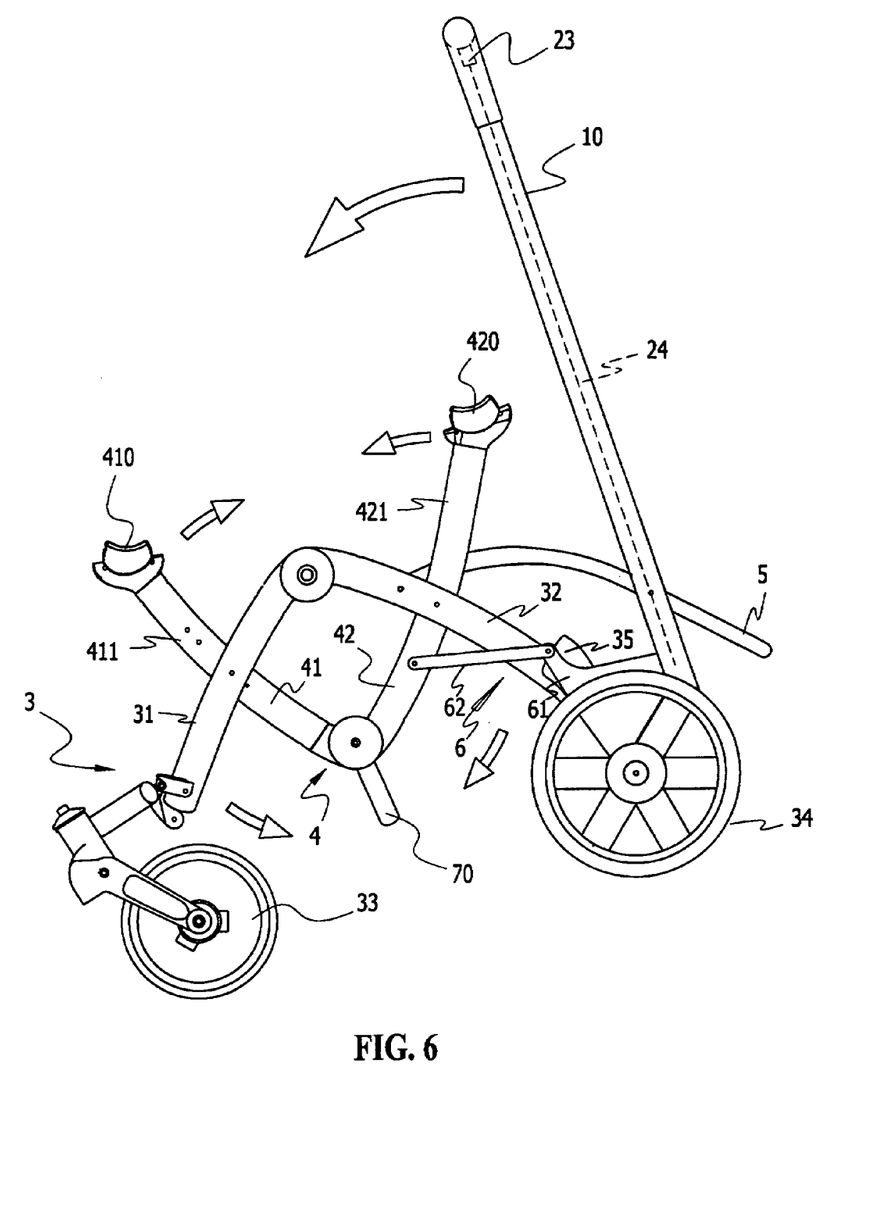
FIG. 6 is a side view schematically showing the operation of folding the stroller of the embodiment of FIG. 4.

FIGS. 4 to 8 show an alternative embodiment of the stroller frame of the present invention. Certain features differ from the first embodiment, including the lower support joint (4) upwardly extending with a pair of front extension arms (411) and a pair of rear extension arms (412), the front extension arms (411) and the pair of rear extension arms (412) having support bases (410) and (420), respectively, the support bases (410) and (420) being furnished at the ends for detachably securing at least one of a front seat (71) and a rear seat (72), respectively, as shown in FIG. 5.

It should also be appreciated that, if the actuator (23) is a one-handed control device such as shown in FIG. 4, it is reciprocally equipped between the push bars and operatively associated with a pair of flexible connecting elements (24A) and (24B) for controlling each side of the folding control mechanisms (2A) and (2B) simultaneously (not separately numbered or visible in the drawings, but understood to be contained within the end of the push bars (10)).

Figure 7:
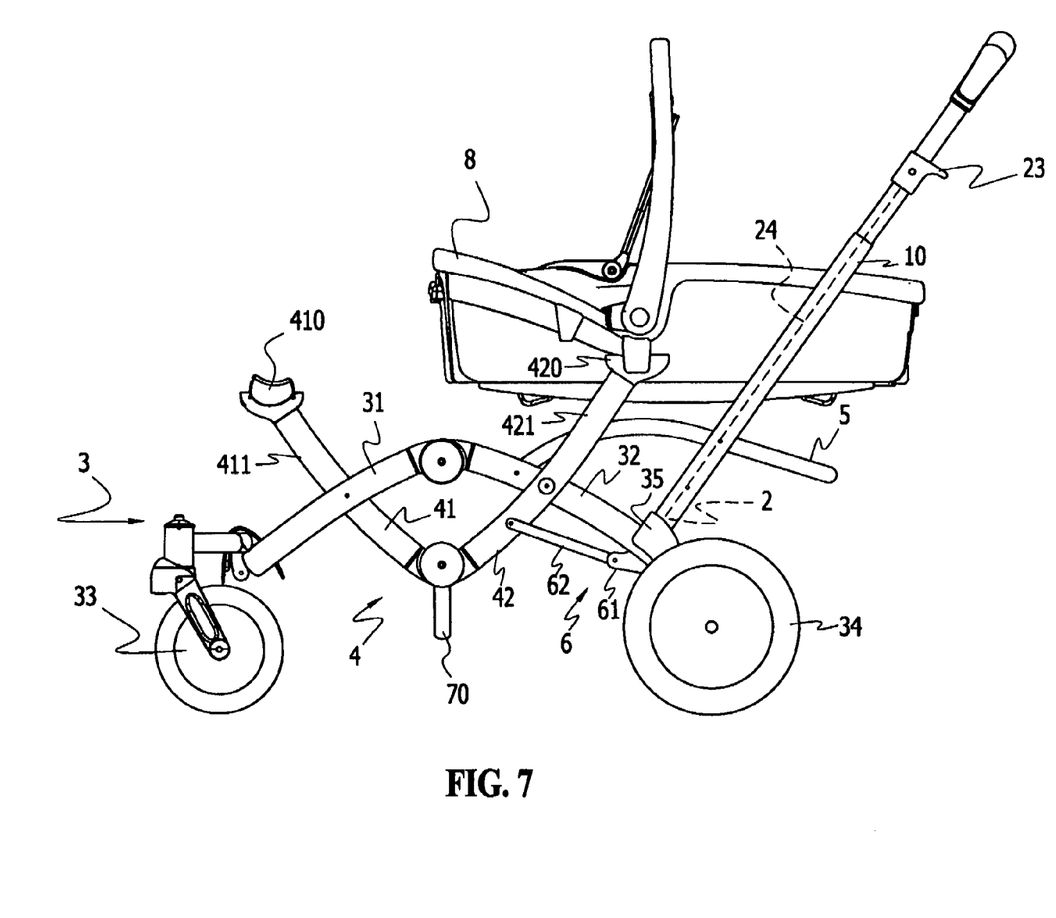
FIG. 7 is a side view schematically showing the operation of the connection of an infant carrier on the stroller frame of the embodiment of FIG. 4.
Figure 8:
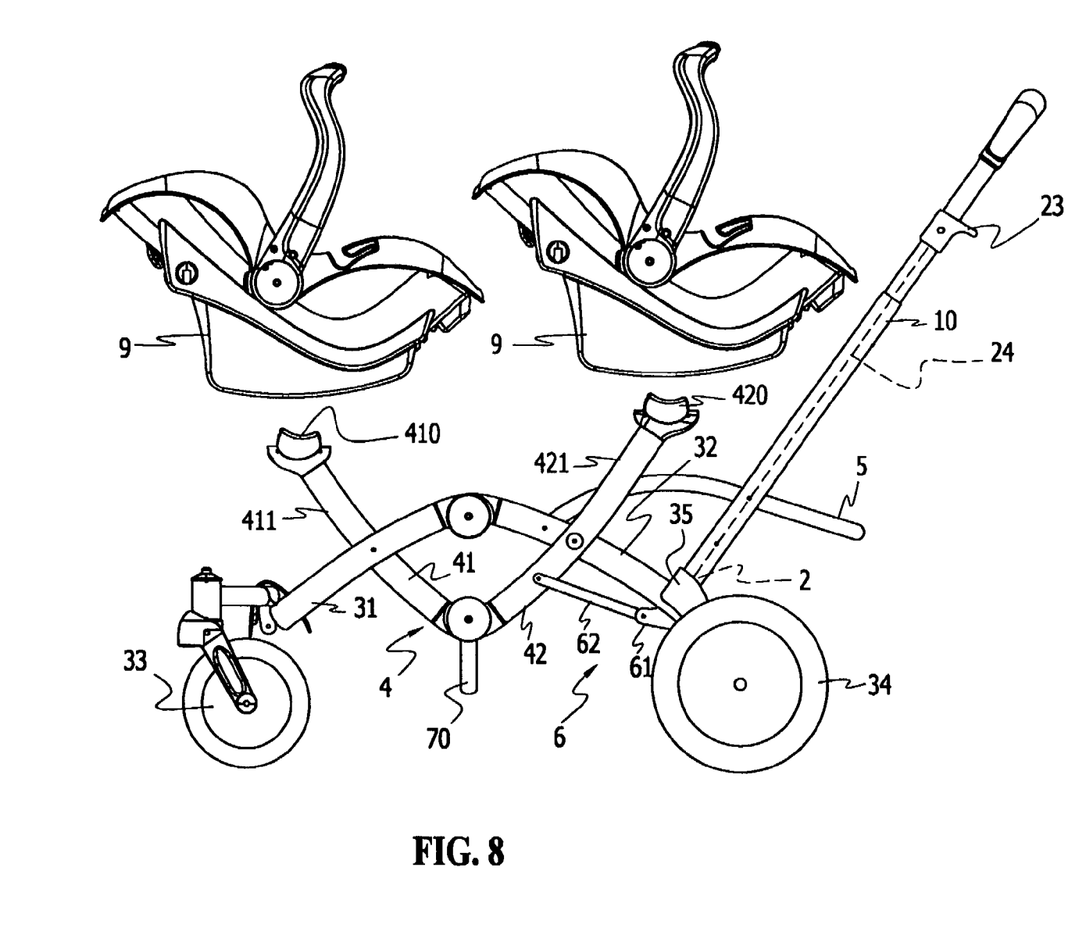
FIG. 8 is a side view schematically showing the operation of the connection of two safety seats on the stroller frame of the embodiment of FIG. 4.

In addition, to ensure sufficient mechanical stability of the extension arms (411) and (412) in supporting the seats (71) and (72) as shown in FIG. 5, the infant (8) as shown in FIG. 7, or the safety seats (9), a transverse rod (70) is preferably connected between both sides of the lower support joints (4). Preferably, the transverse rod (70) is formed with a substantially U-shaped configuration.

Referring back to FIG. 7, this figure schematically shows the folding operation of the stroller frame of the present embodiment being approximately as same as the operation introduced in FIG. 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A baby stroller frame, comprising:
    a wheeled support, having a pair of front legs, a pair of rear legs, and a pair of push bars, the front legs being pivotally connected with the rear legs;
    a lower support joint, having a front support element and a rear support element, the front support element having one end pivoted to the front leg and another end pivotally connected with the rear support element;
    an upper support, having a portion pivoted at the upper ends of the front legs and the rear legs, one end pivoted to the push bars, and another end connected with a connector; and
    a connecting joint having a first connecting piece and a second connecting piece, the first connecting piece having one end pivoted to the rear leg and another end pivotally connected with the pair of push bars, the second connecting piece having one end pivotally connected with the rear support element, and another end pivoted to the first connecting piece;
    wherein an actuator is movably mounted on the push bars and operatively associated with a folding control mechanism via a flexible connecting element for locking and releasing the push bars so as to control the rotation thereof.

2. The baby stroller frame as claimed in claim 1, wherein the folding control mechanism comprises a locking element and a resilient element both telescopically accommodated within one end of the push bars, the locking element being lockable with a positioning portion on the rear leg, so as to stop the rotation of the push bars relative to the upper support and the rear legs and form a cross-shaped linkage system for keeping the stroller frame in an erect position.

3. The baby stroller frame as claimed in claim 1, wherein the rear leg of the wheeled support further comprises a holding base mounted on the rear leg for releasably engaging with the folding control mechanism, so as to stop the rotation of the push bars relative to the upper support and the rear legs to form a cross-shaped linkage system for keeping the stroller frame in an erect position.

4. The baby stroller frame as claimed in claim 1, wherein the flexible connecting element is a wire operatively associated between the actuator and the folding control mechanism.

5. The baby stroller frame as claimed in claim 1, wherein the connector is detachably connected with the upper support is for securing a seat.

6. The baby stroller frame as claimed in claim 1, wherein the connector is detachably connected with the upper support for securing a safety seat.

7. The baby stroller frame as claimed in claim 1, wherein the connector is detachably connected with the upper support for securing an infant carrier.

8. The baby stroller frame as claimed in claim 1, wherein the actuator is a one-handed control device reciprocally equipped between the push bars and operatively associated with a pair of flexible connecting elements for simultaneously controlling each side of the folding control mechanism.

9. The baby stroller frame as claimed in claim 2, wherein the flexible connecting element is a wire running through the push bar of the wheeled support and is operatively associated with the actuator and the locking element.

10. The baby stroller frame as claimed in claim 2, wherein the resilient element is normally biased on the locking element, so as to keep the locking element locked into a positioning portion on the rear leg, so as to form a cross-shaped linkage system to restrict the rotation of the push bars relative to the rear leg and the upper support, for keeping the whole stroller frame in an erect position.

11. A baby stroller frame, comprising:
    a wheeled support, having a pair of front legs, a pair of rear legs, and a pair of push bars, the front legs being pivotally connected to the rear legs;
    a lower support joint, having a front support element and a rear support element, the front support element being pivoted to the front leg and having front extension arms which extending upwardly and being furnished with a pair of support bases, the rear support element being pivotally connected with the rear leg of the wheeled support and having rear extension arms extending upwardly and being furnished with another pair of support bases;

an upper support, having a portion pivoted at the upper ends of the front legs and the rear legs, one end being pivoted to the push bars and another end being connected with a connector; and a connecting joint having a first connecting piece and a second connecting piece, the first connecting piece having one end pivoted to the rear leg and another end pivotally connected with the pair of push bars, the second connecting piece having one end pivotally connected with the rear support element, and another end pivoted to the first connecting piece, wherein an actuator is movably mounted on the push bars and operatively associated with a folding control mechanism via a flexible connecting element for locking and releasing the push bars so as to control the rotation thereof.

12. The baby stroller frame as claimed in claim 11, wherein the folding control mechanism comprises a locking element and a resilient element both telescopically accommodated within one end of the push bars, the locking element being lockable with a positioning portion on the rear leg, so as to stop the rotation of the push bars relative to the upper support and the rear legs and form a cross-shaped linkage system for keeping the stroller frame in an erect position.

13. The baby stroller frame as claimed in claim 11, wherein the rear leg of the wheeled support further comprises a holding base mounted on the rear leg for releasably engaging with the folding control mechanism, so as to stop the rotation of the push bars relative to the upper support and the rear legs to form a cross-shaped linkage system for keeping the stroller frame in an erect position.

14. The baby stroller frame as claimed in claim 11, wherein the flexible connecting element is a wire operatively associated between the actuator and the folding control mechanism.

15. The baby stroller frame as claimed in claim 11, wherein the support bases of the front extension arms are detachably secured to a front seat, and the support bases of the rear extension arms are detachably secured to a rear seat.

16. The baby stroller frame as claimed in claim 11, wherein the support bases of the front extension arms are detachably secured to a safety seat, and the support bases of the rear extension arms are detachably secured to another safety seat.

17. The baby stroller frame as claimed in claim 11, wherein the support bases of the front extension arms and rear extension arms are detachably secured to an infant carrier.

18. The baby stroller frame as claimed in claim 11, wherein the actuator is a one-handed control device reciprocally equipped between the push bars and operatively associated with a pair of flexible connecting elements for simultaneously controlling each side of the folding control mechanism.

19. The baby stroller frame as claimed in claim 12, wherein the flexible connecting element is a wire running through the push bar of the wheeled support and is operatively associated with the actuator and the locking element.

20. The baby stroller frame as claimed in claim 12, wherein the resilient element is normally biased on the locking element, so as to keep the locking element locked into a positioning portion on the rear leg, so as to form a cross-shaped linkage system to restrict the rotation of the push bars relative to the rear leg and the upper support, for keeping the whole stroller frame in an erect position.

* * * * *